Figure 1:
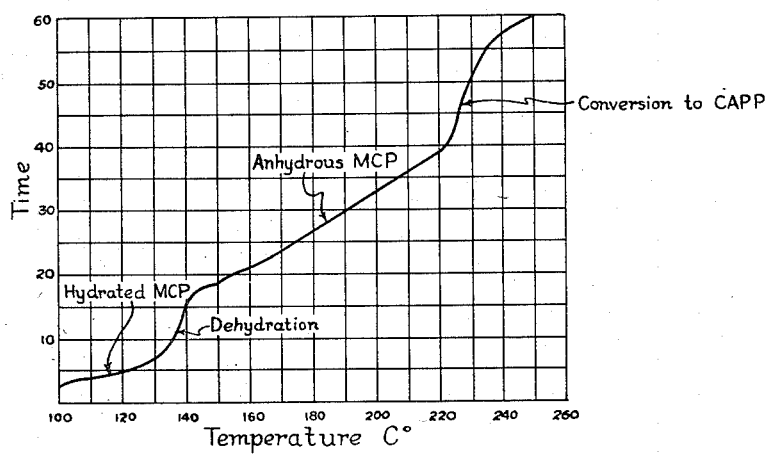

Inventors
Edwin Cox
Robert H. Keane
Frank B. Carpenter, Jr.
Wilbur K. Enos

Patented Feb. 10, 1942

2,272,617

UNITED STATES PATENT OFFICE 2,272,617

CALCIUM ACID PYROPHOSPHATE COMPOSITION AND METHOD OF PRODUCTION

Edwin Cox and Robert H. Kean, Richmond, Va., and Frank B. Carpenter, Jr., and Wilbur K. Enos, Charleston, S. C., assignors to Virginia-Carolina Chemical Corporation, Richmond, Va., a corporation of Virginia Application March 18, 1939, Serial No. 262,734

2 Claims. (Cl. 23—108)

This invention pertains to an acid calcium salt of pyrophosphoric acid, and to its production.

There are several series of phosphoric acid, such as orthophosphoric acid, metaphosphoric acid, and pyrophosphoric acid. These form series of salts that vary in their degree of neutralization. Thus, from orthophosphoric acid, the formula for which is $H_3PO_4$, there are primary or mono-orthophosphates in which one of three available hydrogen atoms has been replaced by a base. Monocalcium orthophosphate is referred to hereinafter as MCP. There are also secondary orthophosphates and tertiary orthophosphates in which two and three hydrogen atoms, respectively, have been replaced by a base.

In comparison, the formula for pyrophosphoric acid is $H_4P_2O_7$. In the calcium acid salt of pyrophosphoric acid only part of the hydrogen has been replaced by calcium. Calcium acid pyrophosphate is referred to hereinafter as CAPP. It has been stated that CAPP is not stable and that attempts to produce CAPP have resulted in some compound of metaphosphoric acid rather than the desired CAPP.

An object of this invention is to produce CAPP as a stable salt. A special purpose is to form CAPP in finely divided condition, to be utilized for example where extensive surface is desirable. Also, a purpose of this invention is to manufacture CAPP in simple manner, under easily controlled conditions, and by inexpensive methods suitable for commercial manufacture on a large scale, and particularly by a dry method of production. A more specific object is to produce CAPP in useful and novel combinations with MCP. These objects and others will be apparent in the illustrative description of this invention accompanying the drawing and particularly pointed out in the appended claims.

In the drawing:

Figure 1 presents a curve showing the conversions that occur on heating hydrated MCP to different temperatures up to about 260° C.

Figure 2:
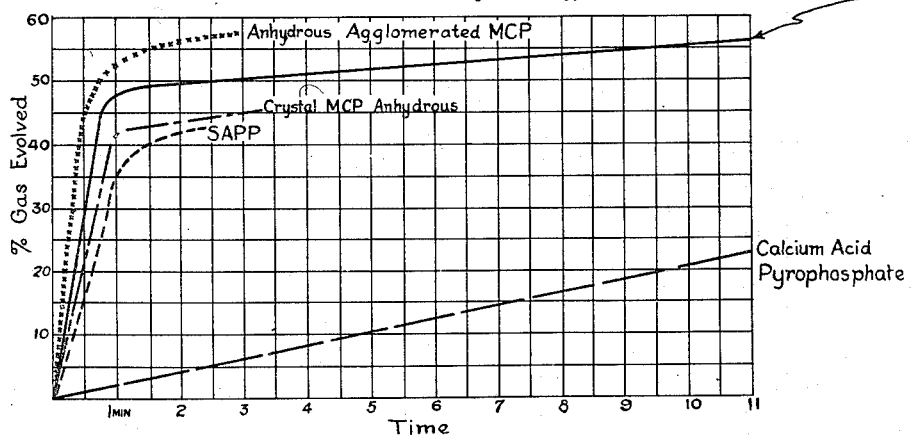

Figure 2 is a chart showing curves for rates of evolution of carbon dioxide gas from sodium bicarbonate solution by various acid phosphates.

The processing procedure under this invention rests on our observation that CAPP may be obtained by controlled heating of MCP to temperatures within the range of 200 to 250° C., or even about 265° C. to 300° C.

Transformations that occur on heating MCP are shown in Figure 1. Various forms of MCP may be treated, for example the crystalline hydrate, of formula $Ca(H_2PO_4)_2H_2O$, having the form of rhombic crystals. The curve in Figure 1 shows that as heating of this hydrate proceeds, there is a temperature range during which anhydrous monocalcium phosphate is obtained rapidly, namely, about 135 to 140° C. In commercial practice dehydration occurs below this temperature range, but at slower rates; dehydration occurs above this temperature range, but with much greater difficulty of control of the product. Or, one may start with anhydrous MCP, either obtained by dehydration or obtained by crystallization from phosphoric acid solutions. Conditions of concentration and temperature for obtaining such crystallized MCP are well known. For example, such have been described in Mellor's Treatise on Inorganic Chemistry, volume 3, page 866, and references cited therein; or described by Clark in Journal of Physical Chemistry, volume 35, page 1232 (1931). Anhydrous MCP is a crystal of triclinic form.

As Figure 1 shows, heating of MCP above 140° C., is accompanied by temperature rise until another change occurs. This is a transformation to CAPP in which hydrogen and oxygen in proportions to form water are expelled from the MCP. This conversion occurs most effectively at about 200 to 250° C. at atmospheric pressure.

This invention is not restricted to converting MCP of chemical purity, but may utilize commercial varieties in which dicalcium phosphate and tricalcium phosphate are present. However, these secondary and tertiary salts result in impurities in the final CAPP and it often is desirable to minimize the dicalcium salt.

Calcium acid pyrophosphate as thus formed is expressed by the formula $CaH_2P_2O_7$. It is an anhydrous salt. It is free from phosphoric acids. This may be determined by washing the product in acetone to dissolve any free phosphoric acid and testing the extracts for free phosphoric acid. Also, chemical tests show the product to be free from ortho- and meta-phosphates.

Calcium acid pyrophosphate thus formed is white or colorless. It is insoluble in acetone. In water it is soluble less than 4 parts in 100 at 20° C., somewhat less than either hydrated or anhydrous MCP. Calcium acid pyrophosphate is odorless. It is of acid taste and exhibits a pH in 0.5% aqueous solution of 3.18 to 3.20, as compared with a pH of 3.9 to 4.3 for 0.5% solutions of MCP.

The neutralizing value of CAPP for sodium bicarbonate to an endpoint of pH 8.2 is about 60 to 64 as compared with about 88.8 for MCP. Neutralizing value is a weight of sodium bicarbonate expressed as percentage of the weight of acid phosphate to neutralize the bicarbonate. Neutralizing value is determined by adding to acid phosphate under test an excess of standard NaOH. The solution is boiled for one minute; then excess NaOH is determined by titrating the solution hot to a phenolphthalein endpoint with standard acid.

Rate of release of gas from sodium bicarbonate by CAPP is considerably slower than by either hydrated or anhydrous MCP. At room temperatures, CAPP released from sodium bicarbonate the following percentages of the total available carbon dioxide gas:

| | Per cent |
|---|---|
| 2 minutes | 2 |
| 5 minutes | 9 |
| 30 minutes | 50 |

Completion at temperature of boiling water.

The reaction goes to rapid completion at 100° C. Comparative rates for MCP are relatively rapid though varying slightly with the physical character of the material. They attain:

| | Per cent |
|---|---|
| 1 minute | 48 |
| 2 minutes | 50 |
| 30 minutes | 60 |

Figure 2 also compares CAPP with sodium acid pyrophosphate.

Anhydrous calcium acid pyrophosphate takes up moisture from a very humid atmosphere, but loses moisture when exposed to a relatively dry atmosphere. This moisture is apparently largely superficial and in large part governed by the physical character of the CAPP.

When CAPP is prepared from MCP the resulting macroscopic appearance is characteristic of the material heated and consequently is rounded nodular from MCP of that character, rhombic in gross appearance from monohydrate MCP crystals, or triclinic from anhydrous MCP crystals. The rate of conversion to CAPP varies somewhat with the physical character of the MCP utilized as source material. Somewhat longer heating or heating nearer the higher temperature of the described ranges is necessary with crystal materials than materials of more open structure.

This invention admits of controlling the conversion of MCP to CAPP to obtain composite particles in which the central portion is of anhydrous MCP, while the surface contains a greater percentage of calcium and phosphorus than the anhydrous MCP. Partial conversion to CAPP on the surfaces can be controlled by the amount of heat applied, by the time of heating, and by the physical character of the MCP heated. Utilization of hydrated phosphate as source material permits introducing considerable range in porosity or potentially reactive surface into the final product, since prior to conversion to CAPP heating of crystalline hydrated MCP or commercial MCP evolves moisture to leave the mass in porous condition.

Anhydrous MCP in crystalline form may consist of dense, non-porous, discrete crystals. Utilization of such anhydrous MCP crystals as source material in the process of this invention results in final particles having a dense, non-porous crystal core coated with calcium acid pyrophosphate.

In transforming MCP to CAPP, agglomerated MCP of relatively large surface area was converted to CAPP in a period of the order of 5 to 15 minutes, while anhydrous crystal MCP required heating from periods of 75 to 120 minutes. The physical character of the MCP influences also the amount of CAPP required to adequately cover the surfaces. This is illustrated in the following representative examples of partial conversion of MCP particles to CAPP.

*Conversion to CAPP*

| | Temp. | Time | CAPP |
|---|---|---|---|
| | °C. | Min. | Percent |
| Commercial MCP | 221–231 | 5 | 32 |
| | 231–236 | 10 | 56 |
| Commercial MCP free from di- and tri-orthophosphate | 225–233 | 5 | 23 |
| | 230–234 | 10 | 30 |
| | 208–212 | 10 | 22 |
| Crystal MCP, hydrated, pure | 221–231 | 5 | 10 |
| | 231–236 | 10 | 24 |
| | 230–234 | 10 | 6 |
| Anhydrous crystal MCP | 221–231 | 5 | 1 |
| | 231–236 | 10 | 15 |
| Anhydrous agglomerate | 230–235 | 10 | 23 |

While conversion within the temperature range of about 230 to 235° C. is described in this table, slower conversion can be obtained at temperatures as low as 200°. However, above 250° C. other phosphates than acid pyrophosphates are obtained; that is, calcium metaphosphates and polyphosphates begin to appear. Hence, from 250° to 300° C. one may obtain coatings of CAPP admixed with other phosphates. These coated products are characterized by lower neutralizing value and a lower pH than for CAPP. For example, at 265° C., a product is formed having a pH of 3.1 and a neutralizing value of 51.

In these various new products, it has been found that although total acidity as evidenced by neutralizing value declines, so also does pH, though free acids are absent. This increased hydrogen ion concentration is a definite and unusual characteristic of the products of this invention.

It has been stated that CAPP is less soluble than MCP. Consequently, the control made possible by the present invention makes feasible substantially any rate of reaction of calcium phosphate with carbonate intermediate the rate for hydrated MCP and that for CAPP. With MCP forming the interior of the partially converted particles described, CAPP acts initially as a sheath to prevent contact of liquid. This may be termed "retarded MCP".

Although it has been indicated that this conversion by heating MCP occurs under atmospheric conditions, it is contemplated that diminished pressure or vacuum is of assistance.

A preferred application of this invention is production of CAPP by heating open structure or porous MCP at 230–240° C. Important utility results from partial conversion of MCP into CAPP at the surfaces of the particles being heated, when anhydrous crystalline MCP is heated for a limited time, say 15 minutes or less, at temperature of 230–240° C. The total composition may be about 75–90% anhydrous MCP and about 25–10% CAPP. Also, it is useful in many applications of this invention to heat open structure MCP to a temperature above 250, say 265° C., to form a mixture of CAPP and metaphosphate or polyphosphates. These operations can be controlled by concurrent determination of pH value, of loss of weight, of loss in neutralizing value, or of rate of reaction with sodium bicarbonate solution. Reaction is stopped by cooling below the selected temperature.

These new products are of various utility.

They may be used in leavening compounds with materials adapted to evolve carbon dioxide, such as sodium bicarbonate or substantially any other carbonate. They may be used as buffer salts in the control of bacterial organisms known as "rope" organisms in bread making; in buffering the alkalinity of dentifrices; in clarification of sugar and various other organic solutions. Also, they supply pyrophosphate ion. Further, they afford a desirable source of calcium and phosphate and are particularly well adapted for the practice of phosphating flour, and such cereals.

In accordance with the patent statutes, we have disclosed the purposes of this invention and have illustrated the preferred practices thereof, but it will now be apparent to those skilled in the art that specific variations may occur within the scope of the appended claims.

What we claim is:

1. As an article of manufacture, particles of substantially pure anhydrous monocalcium phosphate individually coated with calcium acid pyrophosphate, the coating being free from phosphoric acid and free from ortho- and metaphosphates, and from alkali metals, the coating consisting of calcium acid pyrophosphate constituting about 10% to 25% of the entire particle.

2. A process comprising heating anhydrous monocalcium phosphate crystals free from excess calcium and from free acid and from alkali metal and from moisture for about 5 to 15 minutes at about 230° C. to produce particles of monocalcium phosphate individually covered with substantially pure calcium acid pyrophosphate to the extent of about 10% to 25% of the entire particle.

EDWIN COX.
ROBERT H. KEAN.
FRANK B. CARPENTER, Jr.
WILBUR K. ENOS.